United States Patent
Baxivanelis et al.

(10) Patent No.: US 10,442,047 B2
(45) Date of Patent: Oct. 15, 2019

(54) ACTIVE WATER COOLING OF GEAR MECHANISMS BY MEANS OF A GEOMETRICALLY SPECIALLY FORMED INSERT IN DIAMOND DRILLING DEVICES

(71) Applicant: Hilti Aktiengesellschaft, Schaan (DE)

(72) Inventors: Konstantin Baxivanelis, Kaufering (DE); Thomas Reichenberger, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/580,938

(22) PCT Filed: Jun. 6, 2016

(86) PCT No.: PCT/EP2016/062742
§ 371 (c)(1),
(2) Date: Dec. 8, 2017

(87) PCT Pub. No.: WO2016/198345
PCT Pub. Date: Dec. 15, 2016

(65) Prior Publication Data
US 2018/0161950 A1  Jun. 14, 2018

(30) Foreign Application Priority Data
Jun. 10, 2015  (EP) .................... 15171299

(51) Int. Cl.
*B23B 51/04* (2006.01)
*E21B 3/02* (2006.01)
(Continued)

(52) U.S. Cl.
CPC ........ *B23Q 11/1015* (2013.01); *B23B 51/042* (2013.01); *B23B 51/0486* (2013.01);
(Continued)

(58) Field of Classification Search
CPC ............ B32B 2226/75; B32B 2250/12; B32B 2251/428; B32B 51/042; B32B 51/0486;
(Continued)

(56) References Cited

U.S. PATENT DOCUMENTS 4,223,747 A * 9/1980 Marais ...................... E21B 4/02
175/107
4,321,974 A * 3/1982 Klemm ..................... E21B 4/14
175/215

(Continued)

FOREIGN PATENT DOCUMENTS

| DE | 196 47 575 A1 | 11/1997 |
| DE | 298 03 398 U1 | 5/1998 |
| DE | 10 2006 035345 A1 | 4/2008 |

OTHER PUBLICATIONS

PCT/EP2016/062742, International Search Report dated Sep. 26, 2016, (Two (2) pages).

Primary Examiner — Nicole N Ramos
(74) Attorney, Agent, or Firm — Crowell & Moring LLP (57) ABSTRACT

A drive shaft for a machine tool is connectable to a drilling tool. The drive shaft contains a cavity extending substantially over the entire length of the drive shaft and along the axis of rotation where the cavity contains an inflow opening through which water can be fed along the drive shaft into the drilling tool. An insert device is provided in the cavity, through which, to cool the drive shaft, the water is guided first in a first direction and then in a second direction where the insert device contains a first curved guide element and a second curved guide element for separating the water which is guided in the first direction from the water which is guided in the second direction. The cross-sectional area of the first curved guide element is designed point-symmetrically about (Continued)

a center longitudinal axis to the cross-sectional area of the second curved guide element.

6 Claims, 7 Drawing Sheets

(51) Int. Cl.
*B23Q 11/10* (2006.01)
*B28D 7/02* (2006.01)
*B23Q 11/12* (2006.01)
*E21B 17/00* (2006.01)
*E21B 25/00* (2006.01)

(52) U.S. Cl.
CPC .............. *B23Q 11/127* (2013.01); *B28D 7/02* (2013.01); *E21B 3/02* (2013.01); *E21B 17/006* (2013.01); *B23B 2226/75* (2013.01); *B23B 2250/12* (2013.01); *B23B 2251/428* (2013.01); *E21B 25/00* (2013.01)

(58) Field of Classification Search
CPC ... B32B 51/06; B23Q 11/1015; B23Q 11/127; Y10T 408/45; Y10T 408/455; Y10T 408/44; Y10T 408/26; Y10T 409/304032
See application file for complete search history.

(56) References Cited

U.S. PATENT DOCUMENTS

| | | | |
|---|---|---|---|
| 4,440,247 A * | 4/1984 | Sartor | E21B 10/04 175/387 |
| 5,407,021 A * | 4/1995 | Kane | E21B 4/14 175/296 |
| 5,829,926 A * | 11/1998 | Kammermeier | B23B 51/02 408/59 |
| 7,143,846 B2 * | 12/2006 | Jarvela | E21B 7/20 175/257 |
| 7,647,989 B2 * | 1/2010 | Chan | E21B 17/18 175/317 |
| 8,857,537 B2 * | 10/2014 | Ahonen | E21B 10/38 175/171 |
| 2008/0087333 A1 | 4/2008 | Pfeiffer et al. | |
| 2016/0053550 A1 * | 2/2016 | Wilson | E21B 10/602 175/393 |
| 2016/0084083 A1 * | 3/2016 | Hice | E21B 7/18 299/1.05 |
| 2017/0151692 A1 * | 6/2017 | Reichenberger | B28D 7/02 |
| 2017/0173706 A1 * | 6/2017 | Georgiou | B23Q 11/1015 |

* cited by examiner

ACTIVE WATER COOLING OF GEAR MECHANISMS BY MEANS OF A GEOMETRICALLY SPECIALLY FORMED INSERT IN DIAMOND DRILLING DEVICES

This application claims the priority of International Application No. PCT/EP2016/062742, filed Jun. 6, 2016, and European Patent Document No. 15171299.9, filed Jun. 10, 2015, the disclosures of which are expressly incorporated by reference herein.

BACKGROUND AND SUMMARY OF THE INVENTION

The present invention relates to a drive shaft for a machine tool, for example a core drilling machine, connectable to a drilling tool, in particular to a drill bit, containing a cavity extending substantially over the entire length of the drive shaft and along the axis of rotation which contains at least one inflow opening through which water can be fed along the drive shaft into the drilling tool.

Moreover, the invention relates to an insert device for insertion and positioning in a cavity of a drive shaft.

A water supply unit is an essential and indispensable requirement for virtually all core drilling work as well as for various other work with large and high-performance machine tools (such as, e.g., saws, cutting wheels, or similar). In particular when using a core drilling device for drilling holes in mineral rock by means of a drill bit put into rotation by the core drilling device, it is absolutely necessary to rinse the drill bit. The rock removed when drilling cores and the resulting dust in the form of drilling mud are washed out of the drill bit and out of the bore hole by means of the water used for rinsing. The drill bit would overheat within a very short time if the drilling mud were not washed away and would become fixed in the bore hole such that further drilling would no longer be possible.

A water supply unit for use with a machine tool, such as, for example, a core drilling machine according to the prior art is for example disclosed in the German patent application DE 10 2006 035 345 A1.

The core drilling devices used for core drilling work are often very high-performance in nature and accordingly have high energy consumption. Moreover, the heat development during the execution of core drilling work in core drilling devices poses a considerable problem. Excessive heat development in the interior of a core drilling device can notably reduce its performance and thus the efficiency of a core drilling device. It is also possible for this to lead to permanent damage of the entire core drilling device or individual components. However, there is also the danger that a user of the core drilling device may injure themselves on an excessively heated outer wall which is caused by the heat development in the interior of the core drilling device.

It is therefore the object of the present invention to solve the previously-described problems and in particular to make available a drive shaft for a machine tool, for example a core drilling tool, connectable to a drilling tool, in particular to a drill bit, by means of which damage to the machine tool as well as heat-related injuries to the user can be efficiently prevented. Moreover, an insert device is made available for insertion and positioning in a cavity of a drive shaft by means of which damage to the machine tool as well as heat-related injuries to the user can be efficiently prevented.

To this end, a drive shaft is provided for a machine tool, for example a core drilling machine, connectable to a drilling tool, in particular to a drill bit, containing a cavity extending substantially over the entire length of the drive shaft and along the axis of rotation wherein the cavity contains at least one inflow opening through which water can be fed along the drive shaft into the drilling tool.

The drive shaft is characterized according to the invention in that an insert device is provided in the cavity through which, to cool the drive shaft, the water is guided first in a first direction and then in a second direction, wherein the insert device contains a first curved guide element as well as a second curved guide element for separating the water which is guided in the first direction from the water which is guided in the second direction, and wherein the cross-sectional area of the first curved guide element is designed point-symmetrically about a center longitudinal axis to the cross-sectional area of the second curved guide element.

The water, which is actually provided only for rinsing the drill bit, is hereby efficiently used for cooling the drive shaft and then for cooling the core drilling device. By guiding the water into a first and a second direction, the water is guided for longer through the cavity of the drive shaft whereby greater heat absorption can be generated by the water and thus improved cooling. Due to the curved configuration of the first and second guide element, improved sealing can be achieved from the insert device to the cavity of the drive shaft.

According to one advantageous configuration of the present invention, it may be possible for the insert device to contain a support element to support the insert device in the cavity. By using the support element, improved support of the insert device in the cavity can be ensured.

According to a further advantageous embodiment of the present invention, it may be possible for the insert device to contain at least one positioning element which can be engaged into a corresponding positioning opening on the cavity and whereby a relative movement between the insert device and the drive shaft is prevented.

According to an additional advantageous embodiment of the present invention, it is possible for the insert device to contain at least one separation wall element to guide the water in the first direction as well as to lock the insert device in the cavity. As a result, the water, which enters the cavity, flows in a predetermined flow direction.

With regard to the insert device, the object is achieved by the insert device being designed for insertion and positioning in a cavity of a previously described drive shaft.

Further advantages emerge from the following figure description. Different exemplary embodiments of the present invention are represented in the figures. The figures, the description, and the claims contain numerous features in combination. The person skilled in the art will expediently also consider the features individually and combine them to form suitable further combinations.

DETAILED DESCRIPTION OF THE DRAWINGS

Figure 1:
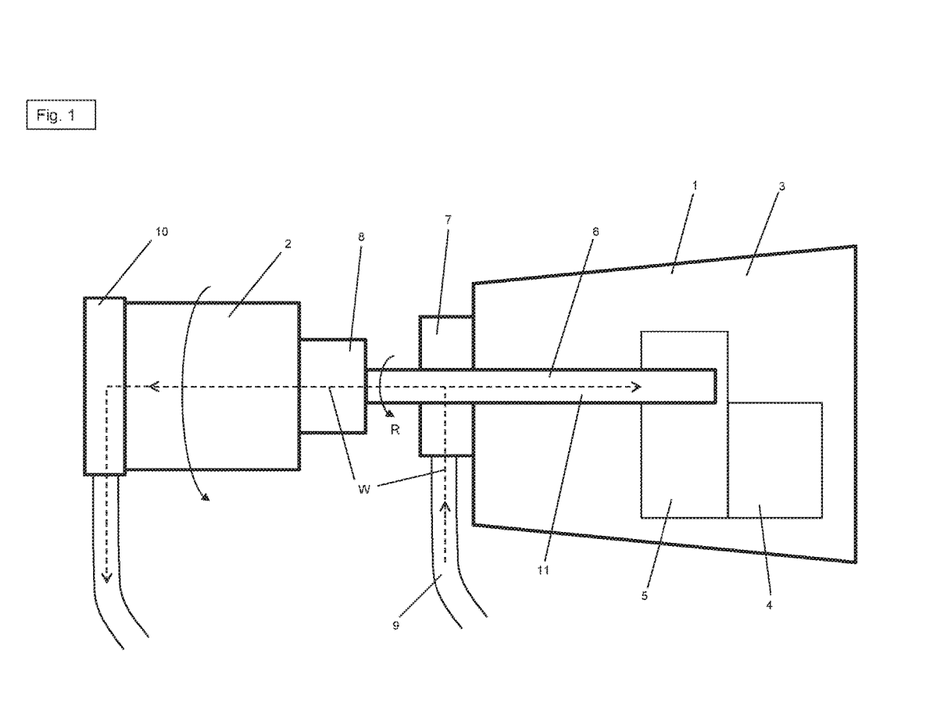
FIG. 1 is a schematic representation of a part of a core drilling machine with a drill bit.

FIG. 1 shows a schematic representation of a machine tool 1 with a drilling tool 2. The machine tool 1 is represented in the form of a core drilling machine and the drilling tool 2 is in the form of a drill bit.

The core drilling machine 1 substantially contains a housing 3, an electromotor 4, a gear mechanism 5, a drive shaft 6, a rinsing head 7, and a tool receiver 8. The electromotor 4, the gear mechanism 5, and a part of the drive shaft 6 are positioned in the housing 3.

The electromotor 4 generates a torque and transfers the torque with the aid of the gear mechanism 5 to the drive shaft 6, which is put into a rotational movement in the rotational direction R. The drive shaft 6 contains a first end 6a and a second end 6b. The first end 6a protrudes out of the housing 3. The second end 6b is connected to the gear mechanism 5 to receive the torque generated in electromotor 4.

The tool receiver 8 is positioned in a torque-proof manner on the first end 6a of the drive shaft 6. The drive shaft 6 is connected to the tool 2 designed as a drill bit in a torque-proof manner via the tool receiver 8. The drill bit 2 contains a first end 2a and a second end 2b.

The rinsing head 7 contains a water inflow 9 by means of which water W can be guided from a water container (not shown) to the core drilling tool 1, drive shaft 6, and in particular to the drill bit 2 to cool and rinse. A suction device 10 is positioned on the first (front) end 2a of the drill bit 2 by means of which the rock and the dust comes from the drill bit 2 by way of the water W in the form of drilling mud.

Figure 2:
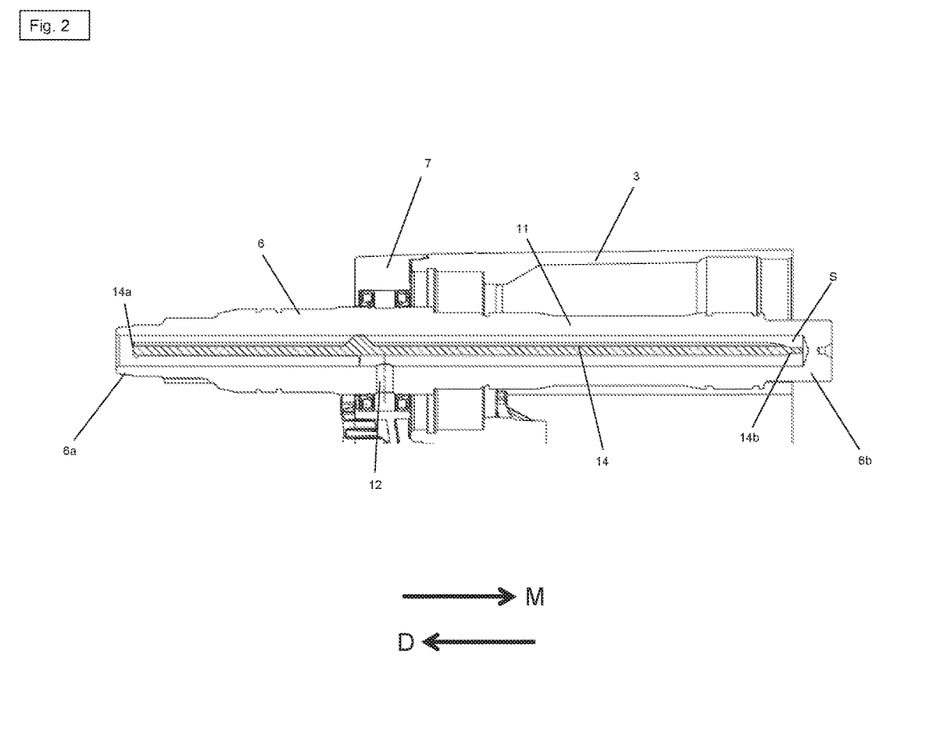
FIG. 2 is a longitudinal cross-section through a drive shaft according to the invention of the core drilling machine and through components of the housing of the core drilling machine.
Figure 3:
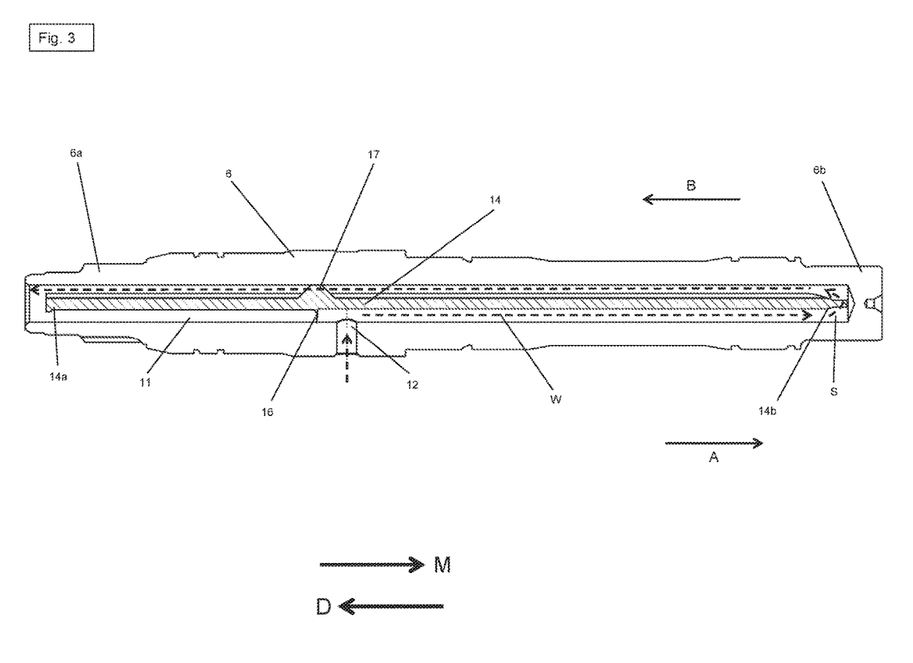
FIG. 3 is a longitudinal cross-section through the drive shaft according to the invention of the core drilling machine together with an insert device.
Figure 4:
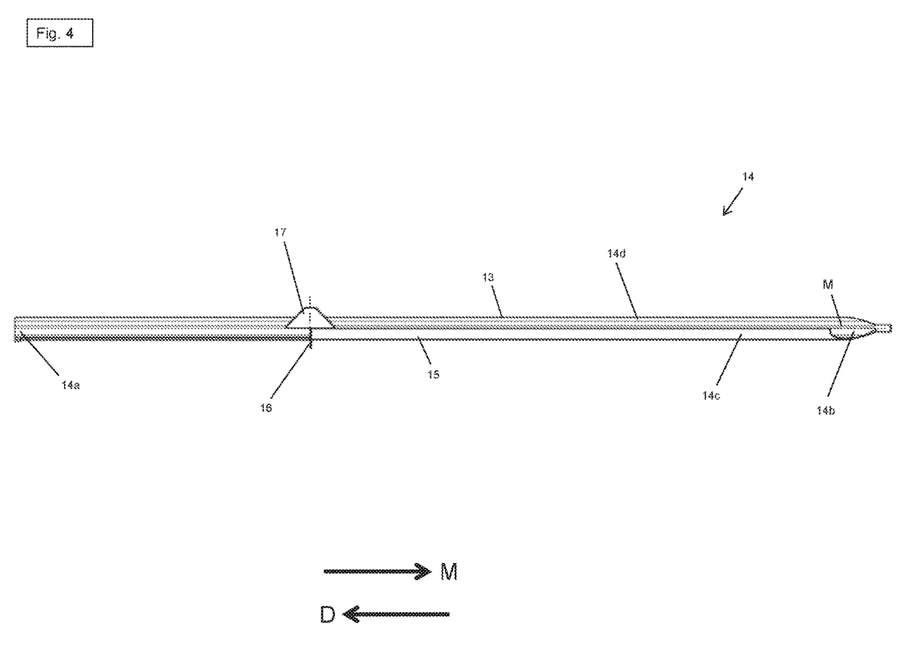
FIG. 4 is a first side view of the insert device.

FIG. 2 shows a cross-section through the drive shaft 6 in a section of the housing 3 of the core drilling tool 1. The drive shaft 6 contains a cylindrical cavity 11 in the form of a blind hole. The blind hole 11 comprises a first end 11a and a second end 11b. The first end 11a constitutes the opening in the blind hole 11. The second end 11b is a closed end. As represented in FIGS. 2 and 3, the drive shaft 6 contains a through-hole 12 in the jacket wall or inner wall 6c. Water W can enter through the through-hole 12 into the interior of the drive shaft 6 and thus into the cavity 11 designed as a blind hole.

The insert device 14 is positioned and fixed again in a detachable manner in the blind hole 11. The insert device 14 serves to guide the water W first in a first direction A and then in a second direction B to cool the drive shaft 6 and inside the drive shaft 6.

As shown in FIGS. 2, 3, 4, and 6, the insert device 14 contains a first end 14a, a second end 14b, a first surface 14c, and a second surface 14d. The first end 14a is designed substantially perpendicular to the longitudinal extension of the insert device 14. The second end 14b is designed substantially in tapered-tip manner. As represented in particular in FIGS. 2 and 3, the second end 14b of the insert device 14 does not end in a planar manner with the second end 11b of the blind hole 11 such that there is a recess S between the second end 14b of the insert device 14 and the second end 11b of the blind hole 11 when the insert device 14 is positioned in the blind hole 11. The recess S serves to allow water W to flow around the insert device 14 at the second end 14b. In other words, the water W is guided at the recess S from the first surface 14c to the second surface 14d and thus changes its flow direction from the first direction A to the second direction B (see FIG. 3).

The insert device 14 also contains a first guide element 13 as well as a second guide element 15, which extend in an opposing manner along the entire length of the insert device 14. The first and second guide element 13, 15 serves to separate the water W which is guided in the first direction A, from the water W which is guided in the second direction B.

Both the first guide element 13 and the second guide element 15 are substantially designed as a curved flat section. The curving of the first guide element 13 runs outwards in the direction C from the center longitudinal axis M of the insert device 14 and the curving of the second guide element 15 runs outwards in the direction D from the center longitudinal axis M of the insert device 14. The first guide element 13 and the second guide element 15 are so wide that a curved front region of the flat section of the first guide element 13 and the second guide element 15 is pressed against the jacket wall or inner wall 6c of the blind hole 11 when the insert device 14 is located in the blind hole 11 (see FIG. 5). The flat section of the first guide element 13 and the second guide element 15 is designed in a resilient and elastic manner in the direction C or D. A sealing takes place between the insert device 14 and the blind hole 11 by pressing the curved front region of the flat section of the first and second guide element 13, 15.

Figure 5:
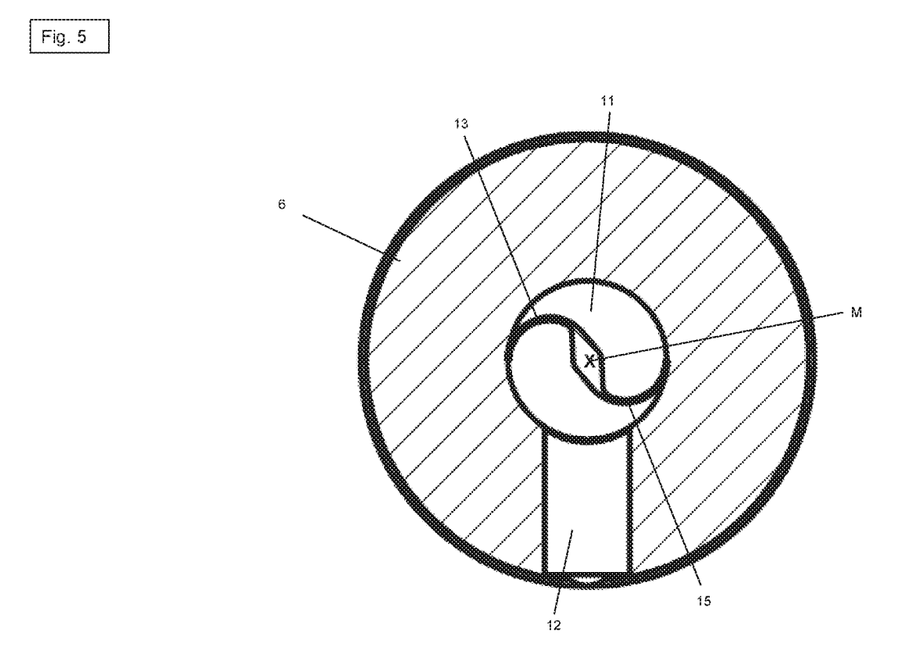
FIG. 5 is a first cross-sectional view through the drive shaft and the insert device.
Figure 6:
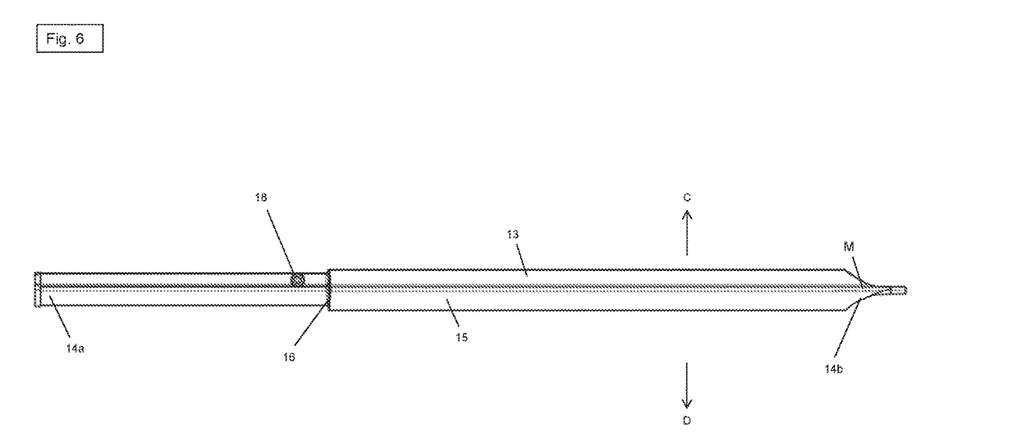
FIG. 6 is a top view on the insert device.
Figure 7:
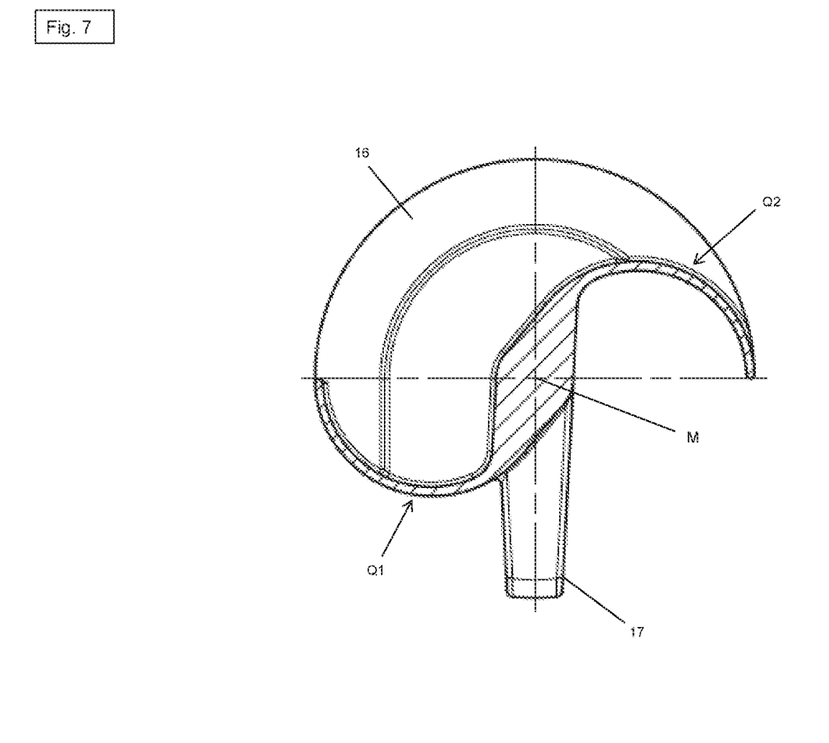
FIG. 7 is a second cross-sectional view through the drive shaft and the insert device.

As represented in FIGS. 5 and 7, the first curved guide element 13 comprises a cross-sectional area Q1 and the second curved guide element 15 comprises a cross-sectional area Q2. The cross-sectional area Q1 is designed point-symmetrically about the center longitudinal axis M to the cross-sectional area Q2. The cross-sectional area of the insert device 14 thus substantially comprises an S-shape (see FIGS. 5 and 7).

Moreover, the insert device 14 contains a separation wall element 16 (see FIGS. 2, 3, 4, 6, and 7). The separation wall element 16 is designed substantially in the form of a semi-circular disc which is applied to the first surface 14c of the insert device 14. The outer edge of the separation wall element 16 corresponds to the jacket wall or inner wall 6c of the cylindrical cavity (blind hole) 11. The separation wall element 16 is designed roughly oversized as well as in a resiliently spring manner such that a certain resistance must be overcome when inserting the insert device 14 into the blind hole 11 and the insert device 14 presses the separation wall element 16 on the jacket wall or inner wall 6c. The insert device 14 is hereby positioned securely in the blind hole 11 and excessively easy removal of the insert device 14 from the blind hole 11 is made difficult. Moreover, by means of the oversizing and the previously described resistance, optimal sealing between the semi-circular disc and the jacket wall or inner wall 6c is achieved. The separation wall element 16 thus seals the insert device 14 against the jacket wall or inner wall 6c of the cylindrical cavity (blind hole) 11 such that water W, which enters the blind hole 11 through the through-hole 12, can only flow in the direction A (see FIG. 3).

However, according to one advantageous embodiment, the insert device 14 contains a support element 17 (see FIGS. 2, 3, 4, and 7). The support element 17 is designed substantially in the form of a fin and extends in a manner favorable to the current along the longitudinal extension of the insert device 14. The support element 17 serves to support the insert device 14 in the cylindrical cavity (blind hole) 11.

According to a further advantageous embodiment, the insert device 14 otherwise contains a positioning element 18 (see FIGS. 2, 3, 4, and 7). The positioning element 18 is designed substantially in the form of a cylindrical protrusion and is positioned on the first surface 14c of the insert device 14. The free end of the positioning element 18 serves to be inserted into a corresponding recess in the cylindrical cavity (blind hole) 11 such that the insert device 14 can be positioned or aligned as precisely as possible, i.e., at a predetermined point and alignment in the cylindrical cavity (blind hole) 11. The corresponding recess in the cylindrical blind hole 11 is not represented in the figures.

The first surface 14c of the insert device 14 serves to guide the water W, which is conveyed into the drive shaft 6 to cool and rinse, into the first direction A and the second surface 14d of the insert device 14 serves to guide the water W into the second direction B. The water W is conveyed to the second end 11b of the cavity 11 designed as a blind hole by means of the first surface 14c (direction A). The water W is located between the first surface 14c and the jacket wall or inner wall 6c of the cavity 11 to cool the drive shaft 6.

When the water W is applied to the second end 14b of the insert device 14, the water W reaches the second surface 14d of the insert device 14 from the first surface 14c via the recess S between the second end 14b of the insert device 14 and the second end 11b of the cavity 11. As already previously described, the water W can be guided around the insert device 14 by way of this recess S and reach the second surface 14d from the first surface 14c (see curved arrow in FIG. 3).

At the second surface 14d, the water W is conveyed to the first end 11a of the cavity 11 designed as a blind hole (direction B). The water W is located between the second surface 14d and the jacket wall or inner wall 6c of the cavity 11 to cool the drive shaft 6.

By way of the open first end 6a of the drive shaft 6, the water W reaches the drilling tool 2 designed as a drill bit to cool and rinse by means of the hollow tool receiver 8.

When the water W is guided along the first and second surface 14c, 14d of the insert device 14, the water W absorbs the heat energy of the core drilling machine 1 and in particular the drive shaft 6 and thus cools the core drilling machine 1 and the drive shaft 6.

When the water W, which is provided for rinsing the drill bit 2, enters the cavity 11 of the drive shaft 6 though the through-hole 12, the drive shaft 6 and consequently the entire core drilling device 1 can be efficiently cooled. By guiding the water W in a first direction A and a second direction B, the water W is guided for longer through the cavity 11 of the drive shaft 6 whereby greater heat absorption can be generated by the water W and thus efficient cooling of the drive shaft 6 and the entire core drilling device 1.

As a result of the first guide element 13 and the second guide element 15 being designed substantially as a curved flat section, improved sealing of the insert device 14 can be achieved in the blind hole 11.

REFERENCE NUMERALS 1 machine tool
2 drilling tool
2a first end of the drilling tool
2b second end of the drilling tool
3 housing
4 electromotor
5 gear mechanism
6 drive shaft
6a first end of the drive shaft
6b second end of the drive shaft
6c jacket wall/inner wall of the cylindrical cavity (blind hole)
7 rinsing head
8 tool receiver
9 water inflow
10 suction device
11 cavity/blind hole
11a first end of the cavity/blind hole
11b second end of the cavity/blind hole
12 through-hole
13 first guide element
14 insert device
14a first end of the insert device
14b second end of the insert device
14c first surface of the insert device
14d second surface of the insert device
15 second guide element
16 separation wall element
17 support element
18 positioning element
A first direction
B second direction
Q1 cross-sectional area of the first guide element
Q2 cross-sectional area of the second guide element
R rotational direction

The invention claimed is:

1. A drive shaft of a machine tool that is connectable to a drilling tool, comprising:
a cavity, wherein the cavity extends substantially over an entire length of the drive shaft and along an axis of rotation and wherein the cavity contains an inflow opening through which water is feedable along the drive shaft into the drilling tool; and
an insert device disposed in the cavity through which the water is guidable first in a first direction and then in a second direction, wherein the insert device contains a first curved guide element and a second curved guide element for separating water which is guided in the first direction from water which is guided in the second direction, wherein a cross-sectional area of the first curved guide element is designed point-symmetrically about a center longitudinal axis to a cross-sectional area of the second curved guide element, and wherein the first curved guide element and the second curved guide element extend along an entire length of the insert device;
wherein the machine tool is a core drilling machine.

2. The drive shaft according to claim 1, wherein the insert device contains a support element and wherein the insert device is supportable in the cavity by the support element.

3. The drive shaft according to claim 1, wherein the insert device contains a positioning element which is engageable into a corresponding positioning opening on the cavity and wherein a relative movement between the insert device and the drive shaft is prevented by the positioning element.

4. The drive shaft according to claim 1, wherein the insert device contains a separation wall element and wherein the separation wall element guides the water into the first direction and locks the insert device in the cavity.

5. An insert device disposed in a cavity of a drive shaft of a machine tool that is connectable to a drilling tool, comprising:
a first curved guide element and a second curved guide element for separating water which is guided in a first direction from water which is guided in a second direction, wherein a cross-sectional area of the first curved guide element is designed point-symmetrically about a center longitudinal axis to a cross-sectional area of the second curved guide element and wherein the first curved guide element and the second curved guide element extend along an entire length of the insert device;

wherein the machine tool is a core drilling machine.

6. A drive shaft of a machine tool that is connectable to a drilling tool, comprising:

a cavity, wherein the cavity extends substantially over an entire length of the drive shaft and along an axis of rotation and wherein the cavity contains an inflow opening; and an insert device disposed in the cavity, wherein the insert device contains a first curved guide element and a second curved guide element, wherein a cross-sectional area of the first curved guide element is designed point-symmetrically about a center longitudinal axis to a cross-sectional area of the second curved guide element, and wherein the first curved guide element and the second curved guide element extend along an entire length of the insert device;

wherein the machine tool is a core drilling machine.

* * * * *